(12) United States Patent
Wang et al.

(10) Patent No.: US 8,405,642 B2
(45) Date of Patent: Mar. 26, 2013

(54) CHARACTER INPUT METHOD AND HANDHELD ELECTRONIC DEVICE

(75) Inventors: Chen Wang, Shanghai (CN); Tony Tsai, Taipei (TW)

(73) Assignee: Inventec Appliances Corp., New Taipei (TW)

(*) Notice: Subject to any disclaimer, the term of this patent is extended or adjusted under 35 U.S.C. 154(b) by 983 days.

(21) Appl. No.: 12/401,088

(22) Filed: Mar. 10, 2009

(65) Prior Publication Data

US 2010/0156817 A1  Jun. 24, 2010

(30) Foreign Application Priority Data

Dec. 24, 2008  (TW) ................................ 97150538 A (51) Int. Cl.
*G06F 3/033* (2006.01)
(52) U.S. Cl. ...................... 345/179; 178/19.01; 382/187
(58) Field of Classification Search ........................ None
See application file for complete search history.

(56) References Cited

U.S. PATENT DOCUMENTS 7,176,887 B2    2/2007  Marvit et al.
2010/0173668 A1*  7/2010  Marui et al. ................ 455/556.1

FOREIGN PATENT DOCUMENTS

TW    I281632    5/2007

OTHER PUBLICATIONS

"Office Action of Taiwan Counterpart Application", issued on May 30, 2012, p. 1-p. 9.

* cited by examiner

*Primary Examiner* — Wayne Young
*Assistant Examiner* — Brian Butcher
(74) *Attorney, Agent, or Firm* — J.C. Patents (57) ABSTRACT

A character input method applicable to a handheld electronic device is provided. The character input method includes the following steps. Firstly, a motion path of the handheld electronic device is sensed. Next, the motion path is transformed into a stroke path. Afterward, an input character corresponding to the stroke path is recognized.

16 Claims, 5 Drawing Sheets

FIG. 6

CHARACTER INPUT METHOD AND HANDHELD ELECTRONIC DEVICE

CROSS-REFERENCE TO RELATED APPLICATION

This application claims the priority benefit of Taiwan application serial no. 97150538, filed on Dec. 24, 2008. The entirety of the above-mentioned patent application is hereby incorporated by reference herein and made a part of specification.

BACKGROUND OF THE INVENTION

1. Field of the Invention

The present invention generally relates to a character input method, in particular, to a character input method applicable to a handheld electronic device.

2. Description of Related Art

In an era of information technology with rapid development of the electronic industry, electronic information is indispensable in people's lives. It is quite common for users to exchange electronic messages and store electronic data on handheld electronic devices, especially, on portable mobile communication devices and personal digital assistants (PDAs). The mobile communication device is, for example, a mobile phone or an electronic device with wireless communication function.

With the progress in various hi-tech products derived from the computer, mobile communication products, and communication network techniques, manufacturers in this field are devoted to bringing forth lighter, thinner, multi-functional, and cheaper hi-tech products and handheld electronic devices to cater for the demands and preferences of the consumers. In particular, the mobile phones and PDAs, the most commonly used at present, are closely related to our life. The capability of those handheld electronic devices to operate more conveniently and efficiently and provide more functions and services has already become an important index to determine whether the manufacturing techniques of the communication products at fair prices are advancing or not.

Currently, manners for operating a handheld electronic device and inputting characters are provided as follows: 1. operation and input through a conventional combination of a numerical keyboard and functional keys; 2. screen handwriting combined with keyboard operations; 3. touch keys combined with keyboard operations; 4. a handwriting pen combined with functional keys; and 5. full-screen touch operations. The current keyboard is, for example, a full keyboard, or referred to as a QWERTY keyboard. Similar to a computer keyboard, the QWERTY keyboard not only has a complete set of keys, but also has multiple combination and functional keys. Compared with the conventional keyboard merely composed of letters and numerals, the QWERTY keyboard provides diversified operating modes, and raises the input speed.

However, when inputting through a keyboard, the user has to first learn the input method and memorize the arrangement of the keyboard, which is not intuitive to the user and also difficult to handle. Further, in screen handwriting, the user must hold the handheld electronic device with one hand, and hold the handwriting pen with the other. Therefore, it is quite inconvenient for the user to operate in a bumpy or crowded mass transportation vehicle.

SUMMARY OF THE INVENTION

Accordingly, the present invention is directed to a character input method, capable of inputting characters without using a keyboard.

The present invention is also directed to a handheld electronic device, which enables a user input a character without using a keyboard.

The present invention provides a character input method applicable to a handheld electronic device, which includes the following steps. First, a motion path of the handheld electronic device is sensed. Then, the motion path is transformed into a stroke path. Afterward, an input character corresponding to the stroke path is recognized.

In an embodiment of the present invention, the step of sensing the motion path includes sensing a plurality of segmental motion paths of the handheld electronic device for constituting the motion path.

In an embodiment of the present invention, the step of sensing one of the segmental motion paths includes: receiving a start instruction to record information of a start position from which the handheld electronic device moves, and recording the information of the start position; recording information of a plurality of middle positions of the handheld electronic device away from the start position; receiving an end instruction to record an end position information at which the movement of the handheld electronic device ends, and recording the information of the end position; and determining the one of the segmental motion paths according to the information of the start position, information of the middle positions, and information of the end position.

In an embodiment of the present invention, the step of transforming the motion path into the stroke path includes transforming the segmental motion paths into a plurality of segmental stroke paths for constituting the stroke path.

In an embodiment of the present invention, the step of transforming one of the segmental motion paths into one of the segmental stroke paths includes obtaining a coordinate range of a handwriting recognition area of the handheld electronic device; calculating a mapping ratio from a coordinate range of said one of the segmental motion paths to the coordinate range of the handwriting recognition area; and mapping said sensed one of the segmental motion paths according to the mapping ratio to the handwriting recognition area, thereby generating a signal to the handwriting recognition area corresponding to said sensed one of the segmental motion paths.

In an embodiment of the present invention, the step of recognizing the input character includes recognizing, through a handwriting input method, the signals corresponding to the segmental motion paths and generated to the handwriting recognition area.

In an embodiment of the present invention, the input character includes a word, a numeral, or a symbol.

A handheld electronic device includes a motion sensing unit, a processing unit, and a display unit. The motion sensing unit senses a motion path of the handheld electronic device. The processing unit receives the motion path, transforms the motion path into a stroke path, and recognizes an input character corresponding to the stroke path. The display unit receives and displays the input character recognized by the processing unit.

In an embodiment of the present invention, the motion sensing unit senses a plurality of segmental motion paths of the handheld electronic device, for constituting the motion path.

In an embodiment of the present invention, in order to sense one of the segmental motion paths, the processing unit records information of a start position of the handheld electronic device sensed by the motion sensing unit according to a start instruction, records information of a plurality of middle positions sensed by the motion sensing unit after information of the start position, records, according to an end instruction, information of an end position of the handheld electronic device sensed by the motion sensing unit, and determine said one of the segmental motion paths according to the information of the start position, the information of the middle positions, and the information of the end position.

In an embodiment of the present invention, the handheld electronic device further includes a storage unit for storing the information the start position, the information of the middle position, and the information of the end position.

In an embodiment of the present invention, the handheld electronic device further includes a triggering unit for triggering the start instruction and the end instruction.

In an embodiment of the present invention, the triggering unit including a keying module.

In an embodiment of the present invention, the processing unit transforms the segmental motion paths into a plurality of segmental stroke paths for constituting the stroke path.

In an embodiment of the present invention, in order to transform one of the segmental motion paths into one of the segmental stroke paths, the processing unit obtains a coordinate range of a handwriting recognition area displayed disposed on the handheld electronic device, and calculates a mapping ratio from a coordinate range of said one of the segmental motion paths to the coordinate range of the handwriting recognition area. The processing unit also maps said sensed one of the segmental motion paths according to the mapping ratio, and generates a corresponding signal to the handwriting recognition area, thereby generating a signal to the handwriting recognition area corresponding to said sensed one of the segmental motion paths.

In an embodiment of the present invention, the processing unit recognizes, through a handwriting input method, the signals corresponding to the segmental motion paths and generated to the handwriting recognition area.

In an embodiment of the present invention, the motion sensing unit includes a g-sensor or a 3D accelerometer.

In an embodiment of the present invention, the input character includes a word, a numeral, and a symbol.

In an embodiment of the present invention, the display unit includes a touch display panel.

In an embodiment of the present invention, the handheld electronic device includes a mobile phone or a personal digital assistant (PDA).

As described above, in the character input method and the handheld electronic device of the present invention, a motion path of the handheld electronic device is sensed, the motion path is then transformed into a stroke path, and an input character is recognized by recognizing the stroke path. Therefore, the user can operate with one hand to realize the input of characters without using a keyboard.

In order to make the aforementioned and other objectives, features, and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
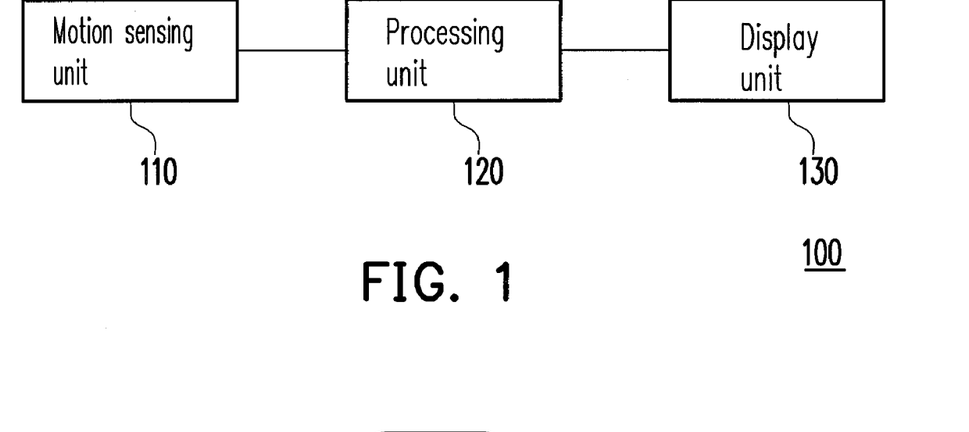
FIG. 1 is a schematic block diagram of a handheld electronic device according to an embodiment of the present invention.

FIG. 1 is a schematic block diagram of a handheld electronic device according to an embodiment of the present invention. The handheld electronic device 100 includes a motion sensing unit 110, a processing unit 120, and a display unit 130. The motion sensing unit 110 includes, for example, a g-sensor or a 3D accelerometer, for sensing a change of the gravity status of the handheld electronic device 100 and generating a sensing signal accordingly. The processing unit 120 is coupled to the motion sensing unit 110 and the display unit 130, for processing a sensing signal sent by the motion sensing unit 110 and outputting a display signal to the display unit 130. The display unit 130 is, for example, a touch display panel, for providing a user with a handwriting input function. In this embodiment, the handheld electronic device 100 is, for example, a mobile phone or a PDA.

Figure 2:
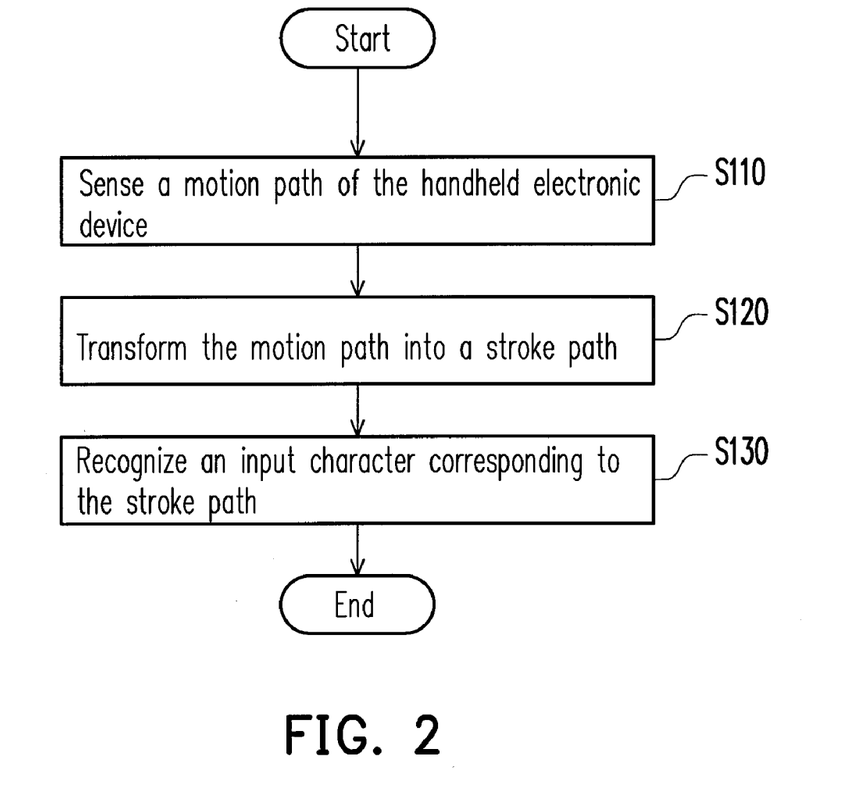
FIG. 2 is a flow chart of a character input method according to an embodiment of the present invention.

FIG. 2 is a flow chart of a character input method according to an embodiment of the present invention. Together referring to FIGS. 1 and 2, the handheld electronic device 100 is, for example, applicable to the character input method in FIG. 2, and the present invention is not limited thereto. First, in Step S110, the motion sensing unit 110 senses a motion path of the handheld electronic device 100. Next, in Step S120, the processing unit 120 receives the motion path, and transforms the motion path into a stroke path. Afterward, in Step S130, the processing unit 120 recognizes an input character corresponding to the stroke path, and outputs the character to the display unit 130 for displaying. In this embodiment, the input character includes a word, a numeral, or a symbol.

Figure 3:
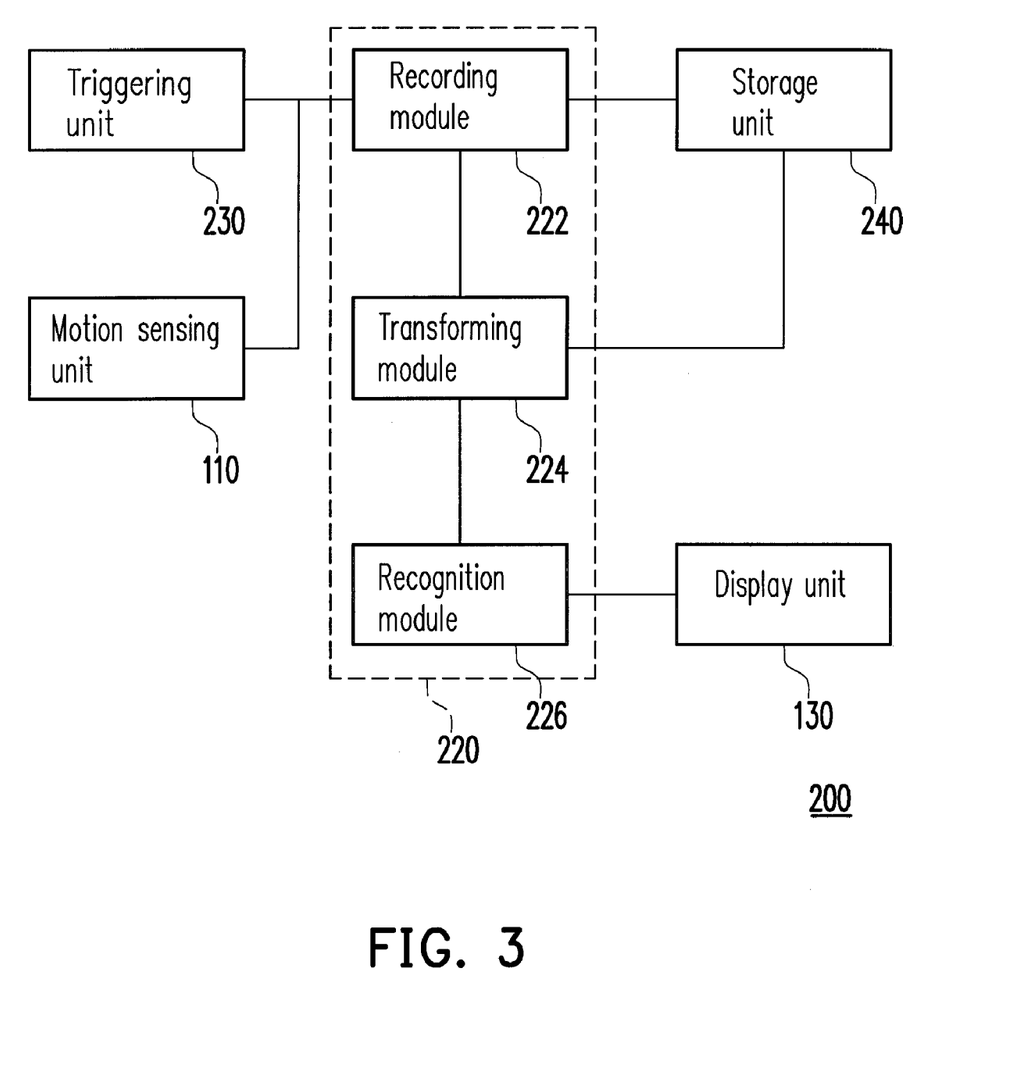
FIG. 3 is a schematic block diagram of a handheld electronic device according to another embodiment of the present invention.
Figure 4:
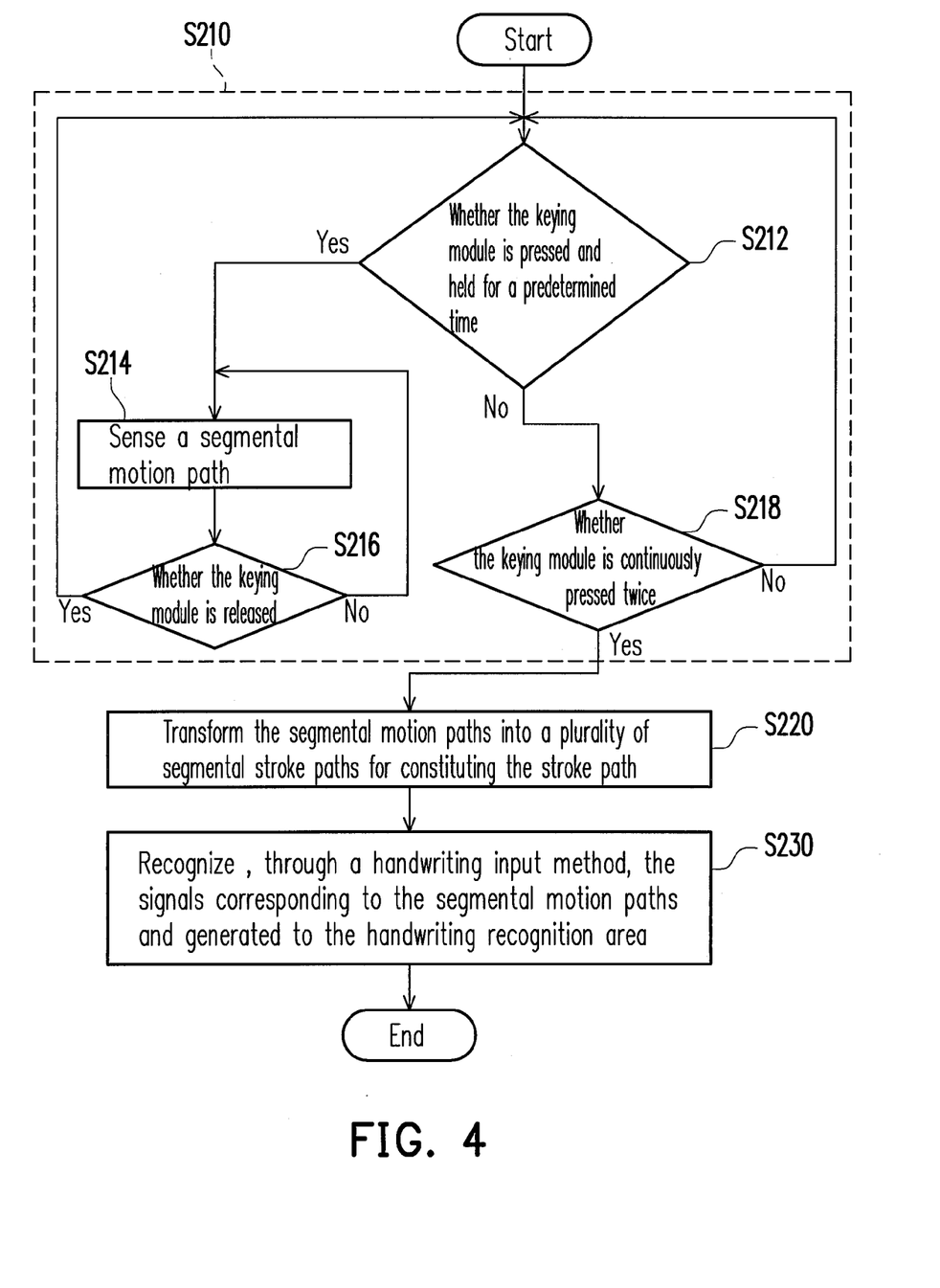
FIG. 4 is a flow chart of a character input method according to another embodiment of the present invention.

FIG. 3 is a schematic block diagram of a handheld electronic device according to another embodiment of the present invention, and FIG. 4 is a flow chart of a character input method according to another embodiment of the present invention. In the following embodiment, the handheld electronic device 200 in FIG. 3 is applied to the character input method in FIG. 4 as an example for illustration.

First, referring to FIG. 3, compared with the handheld electronic device 100 in FIG. 1, in the handheld electronic device 200 of FIG. 3, a processing unit 220 replaces the processing unit 120 in FIG. 1. In this embodiment, the processing unit 220 further includes a recording module 222, a transforming module 224, and a recognition module 226. The recording module 222 is coupled to the motion sensing unit 110, and the transforming module 224 is respectively coupled to the recording module 222 and the recognition module 226. Further, the handheld electronic device 200 of this embodiment further includes a triggering unit 230 and a storage unit 240. The triggering unit 230 and the storage unit 240 are respectively coupled to the recording module 222. The triggering unit 230 is, for example, a keying module or a shortcut key. In addition, the storage unit 240 is a memory.

Referring to FIGS. 3 and 4, for ease of illustration, in the following content, some steps will be described along with the operation of the user. Firstly, in Step S210, the motion sensing unit 110 senses a plurality of segmental motion paths of the handheld electronic device 200 for constituting the motion path. The motion path of each segment is corresponding to a stroke of the character to be input by the user, such that the complete motion path includes all the strokes of the character to be input by the user.

In particular, Step S210 includes sub-steps S212 to S218. First, it is determined whether the keying module is pressed and held for a predetermined time (Step S212), i.e., it is determined whether the triggering unit 230 is triggered. The predetermined time is preferably set according to the operating experience of the user. When the user presses and holds the keying module for a time longer than the predetermined time (Step S214), the triggering unit 230 sends a start instruction to the recording module 222. At this point, the user starts to move the handheld electronic device 200 according to one of the strokes, such that the motion sensing unit 110 senses a segmental motion path of the handheld electronic device 200.

During the continuous sensing of the motion sensing unit 110, the recording module 222 records the segmental motion path in the storage unit 240. Then, it is determined whether the keying module is released (Step S216). If the determination result in Step S216 is positive, i.e., when the user releases the keying module, the triggering unit 230 sends an end instruction to the recording module 222. After the recording module 222 receives the end instruction, the recording of the segmental motion path by the user is finished, and a stroke is successfully input by the user. After the recording of the segmental motion path is finished, the user may again presses and holds the keying module for a predetermined time to input the next stroke, i.e., Steps S212 to 216 are repeated till the user inputs all the strokes. After finishing inputting, the user may continuously press the keying module twice to get a positive determination result in Step S218. At this point, the triggering unit 230 sends a signal corresponding to the completion of the input of all the strokes to the recording module 222. Thereby, all the sub-steps in Step S210 are finished.

Figure 5:
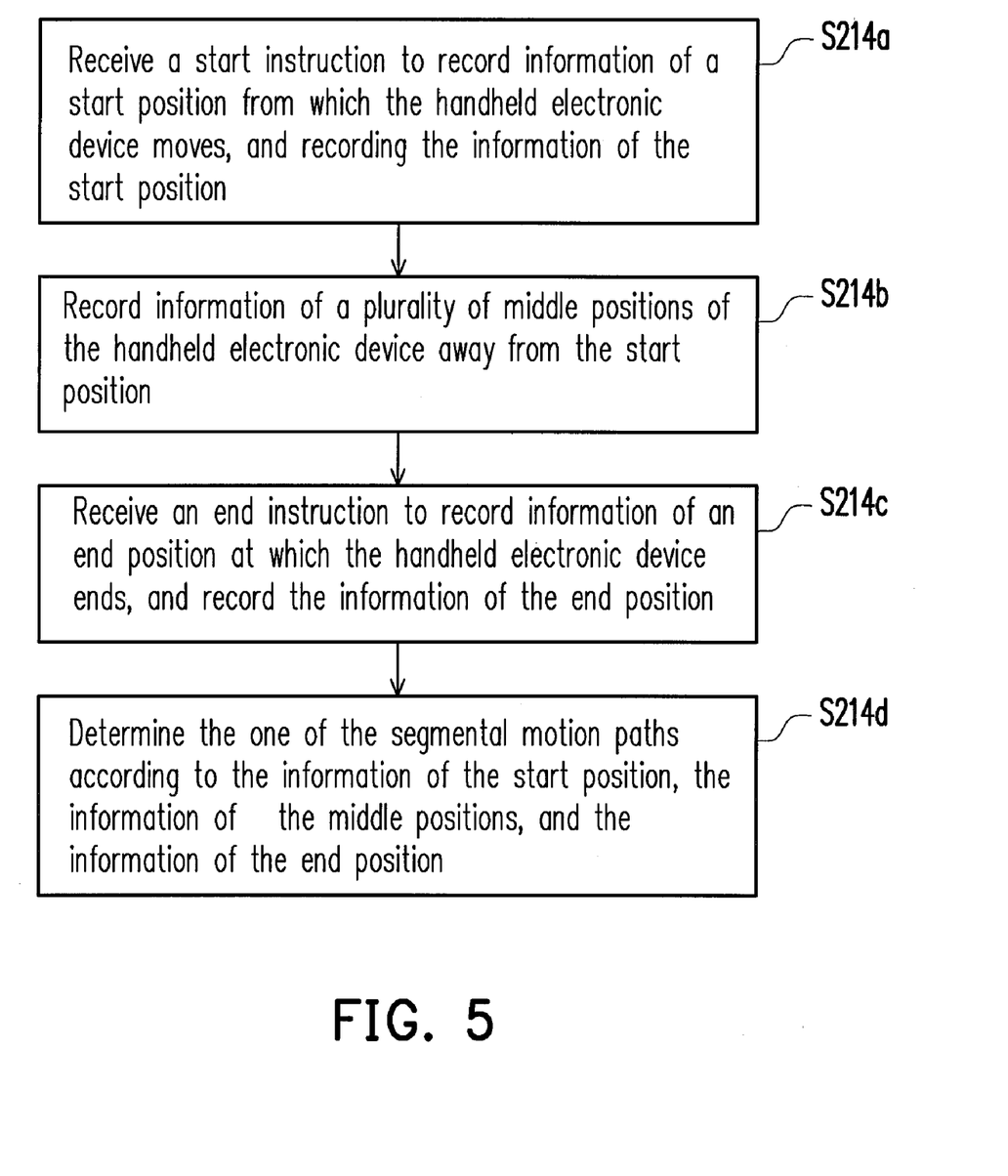
FIG. 5 is a detailed flow chart illustrating the step of sensing a single segmental motion path in FIG. 4.

FIG. 5 is a detailed flow chart illustrating the step of sensing a single segmental motion path in FIG. 4. Referring to FIGS. 4 and 5, the step S214 of sensing a single segmental motion path further includes sub-steps S214a to S214d. When receiving the start instruction sent from the triggering unit 230, the recording module 222 first records information of a start position sensed by the motion sensing unit 110 to the storage unit 240 wherein the start portion is from which the handheld electronic device 200 moves (Step S214a). Then, the motion sensing unit 110 continuously senses information of a plurality of middle positions away from the start position, and the recording module 222 continuously records the information of the middle positions to the storage unit 240 (Step S214b).

When receiving the end instruction sent from the triggering unit 230, the recording module 222 stops recording the information of the middle positions according to the end instruction, and records information of an end position sensed by the motion sensing unit 110 wherein the end position is at which the handheld electronic device 200 ends (Step S214c). Afterward, the recording module 222 determines the one of the segmental motion path according to the information of the start position, information of the middle positions, and the information of the end position (Step S214d).

Further referring to FIG. 4, after recording the segmental motion paths corresponding to all the strokes in the character to be input by the user (Step S210), the transforming module 224 extracts the segmental motion paths from the storage unit 240, and transforms the segmental motion paths into a plurality of segmental stroke paths for constituting a complete stroke path (Step S220).

Figure 6:
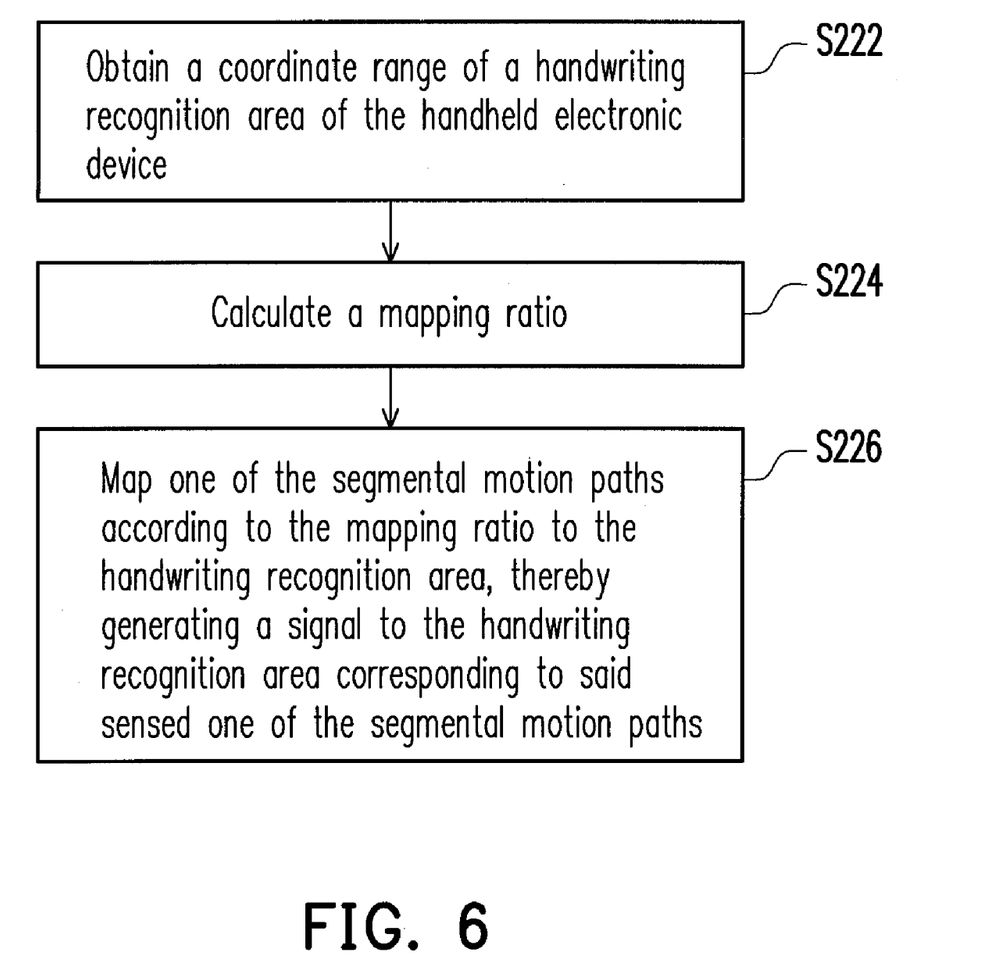
FIG. 6 is a detailed flow chart illustrating the step of transforming the segmental motion paths into a plurality of segmental stroke paths in FIG. 4.

FIG. 6 is a detailed flow chart illustrating the step of transforming the segmental motion paths into a plurality of segmental stroke paths in FIG. 4. Together referring to FIGS. 4 and 6, the step S220 of transforming the segmental motion paths into a plurality of segmental stroke paths further includes sub-steps S222 to S226. First, in Step S222, the transforming module 224 obtains a coordinate range of a handwriting recognition area shown by the display unit 130. Then, in Step S224, the transforming module 224 calculates a mapping ratio according to the coordinate range of the handwriting recognition area and coordinate ranges of the segmental motion paths. In particular, during the calculation of the mapping ratio, the transforming module 224 first obtains all the segmental motion paths from the storage unit 240, and then finds the coordinate range of all the segmental motion paths. The coordinate range is calculated as follows.

$$X1=\min(x); Y1=\min(y);$$

$$X2=\max(x); Y2=\max(y);$$

where min(x), max(x) respectively represent horizontal coordinates of the two outermost ends of all the segmental motion paths in the horizontal direction, and min(y), max(y) respectively represent vertical coordinates of the two outermost ends of all the segmental motion paths in the vertical direction.

After obtaining the coordinate range indicated by X1, X2, Y1, and Y2, the range is operated and compared with the coordinate range of the handwriting recognition area to obtain a mapping ratio, thus ensuring that the transformed coordinates all fall in the coordinate range of the handwriting recognition area. The operation and comparison algorithms are described as follows.

$$\text{If } ((X2-X1)/(Y2-Y1) > \text{Rect.width}/\text{Rect.height})$$

$$\text{Value}=(X2-X1)/\text{Rect.width}$$

$$\text{Else}$$

$$\text{Value}=(Y2-Y1)/\text{Rect.height}$$

where Rect.width is the width of the handwriting recognition area in the horizontal direction, Rect.height is the height of the handwriting recognition area in the vertical direction, and Value is a mapping ratio.

In FIG. 6, after the mapping ratio is calculated (S224), Step S226 is performed. In Step S226, one of the segmental motion paths is mapped according to the mapping ratio to the handwriting recognition area, thereby generating a signal to the handwriting recognition area corresponding to said sensed one of the segmental motion paths, so as to transform one of the segmental motion paths into one of the segmental stroke paths. The algorithm of mapping the $n^{th}$ point in the segmental motion path and generating a corresponding signal is described as follows.

$$X\text{new}(n)=(Xn-X1)/\text{Value}+\text{Rect.left}$$

$$Y\text{new}(n)=(Yn-Y1)/\text{Value}+\text{Rect.top}$$

where Xn(n), Y(n) respectively represent the horizontal and vertical coordinates of the $n^{th}$ point. Rect.left, Rect.top respectively represent the leftmost horizontal coordinate and the topmost vertical coordinate of the handwriting recognition area so as to serve as a reference origin. Xnew(n), Ynew (n) respectively represent the horizontal and vertical coordinates of the signal generated after the $n^{th}$ point is mapping and displayed on the handwriting recognition area.

Assume that a segmental motion path has k points, and n is respectively substituted by 1 to k in the formulae of Xnew(n) and Ynew(n), such that a complete segmental stroke path is generated on the handwriting recognition area. Definitely, after the step of transforming each segmental motion path and generating a corresponding signal is repeatedly performed, the stroke path corresponding to the whole character to be input by the user is sent to the handwriting recognition area. The segmental stroke paths are respectively sent according to the sequence of the information of the start position, the information of the middle positions, and the information of the end position, so as to simulate the initial stroke, the movement, and the ending stroke. Thereby, the segmental motion paths are transformed into a plurality of segmental stroke paths in S220.

Referring to FIG. 4, after Step S220, the recognition module 226 recognizes, through a handwriting input method, the signals corresponding to the segmental motion paths and generates to handwriting recognition area, so as to obtain the character to be input (Step S230).

In view of the above, according to the present invention, a motion path of the handheld electronic device is sensed, the motion path is then transformed into a stroke path, and an input character is generated accordingly. Thereby, the user may input characters by one hand. Further, the user may input characters without using the keyboard, thus reducing the cost. Moreover, the user does not have to learn any keyboard input method, which is suitable for particular groups like the old. In addition, the character input method of the present invention is novel and interesting, which is suitable for children and young people pursuing novelty.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A character input method, applicable to a handheld electronic device, comprising:
sensing a motion path of the handheld electronic device, which step comprises sensing a plurality of segmental motion paths of the handheld electronic device for constituting the motion path, wherein the step of sensing one of the segmental motion paths comprises:
receiving a start instruction to record information of a start position from which the handheld electronic device moves, and recording the information of the start position;
recording information of a plurality of middle positions of the handheld electronic device away from the start position;
receiving an end instruction to record information of an end position at which the movement of the handheld electronic device ends, and recording the information of the end position; and
determining the one of the segmental motion paths according to the information of the start position, the information of the middle positions, and the information of the end position;
transforming the motion path into a stroke path; and
recognizing an input character corresponding to the stroke path.

2. The character input method according to claim 1, wherein the step of transforming the motion path into the stroke path comprises:
transforming the segmental motion paths into a plurality of segmental stroke paths for constituting the stroke path.

3. The character input method according to claim 2, wherein the step of transforming one of the segmental motion paths into one of the segmental stroke paths comprises:
obtaining a coordinate range of a handwriting recognition area of the handheld electronic device;
calculating a mapping ratio from a coordinate range of said one of the segmental motion paths to the coordinate range of the handwriting recognition area; and
mapping said sensed one of the segmental motion paths according to the mapping ratio to the handwriting recognition area, thereby generating a signal to the handwriting recognition area corresponding to said sensed one of the segmental motion paths.

4. The character input method according to claim 3, wherein the step of recognizing the input character comprises:
recognizing, through a handwriting input method, the signals corresponding to the segmental motion paths and generated to the handwriting recognition area.

5. The character input method according to claim 1, wherein the input character comprises a word, a numeral, or a symbol.

6. A handheld electronic device, comprising:
a motion sensing unit for sensing a motion path of the handheld electronic device, wherein the motion sensing unit is configured to sense a plurality of segmental motion paths of the handheld electronic device for constituting the motion path;
a processing unit for receiving the motion path, transforming the motion path into a stroke path, and recognizing an input character corresponding to the stroke path, wherein in order to sense one of the segmental motion paths, the processing unit is configured to record information of a start position of the handheld electronic device sensed by the motion sensing unit according to a start instruction, record information of a plurality of middle positions of the handheld electronic device sensed by the motion sensing unit and away from the start position, records, according to an end instruction, information of an end position of the handheld electronic device sensed by the motion sensing unit, and determine said one of the segmental motion paths according to the information of the start position, the information of the middle positions, and the information of the end position; and
a display unit for receiving and displaying the input character recognized by the processing unit.

7. The handheld electronic device according to claim 6, further comprising:
a storage unit for storing the information of the start position, the information of the middle positions, and the information of the end position.

8. The handheld electronic device according to claim 6, further comprising:

a triggering unit for triggering the start instruction and the end instruction.

9. The handheld electronic device according to claim 8, wherein the triggering unit comprises a keying module.

10. The handheld electronic device according to claim 6, wherein the processing unit transforms the segmental motion paths into a plurality of segmental stroke paths for constituting the stroke path.

11. The handheld electronic device according to claim 10, wherein in order to transform one of the segmental motion paths into one of the segmental stroke paths, the processing unit obtains a coordinate range of a handwriting recognition area disposed on the handheld electronic device, calculates a mapping ratio from a coordinate range of said one of the segmental motion paths to the coordinate range of the handwriting recognition area, and mapping said sensed one of the segmental motion paths according to the mapping ratio to the handwriting recognition area, thereby generating a signal to the handwriting recognition area corresponding to said sensed one of the segmental motion paths.

12. The handheld electronic device according to claim 11, wherein the processing unit recognizes, through a handwriting input method, the signals corresponding to the segmental motion paths and generated to the handwriting recognition area.

13. The handheld electronic device according to claim 6, wherein the motion sensing unit comprises a g-sensor or a 3D accelerometer.

14. The handheld electronic device according to claim 6, wherein the input character comprises a word, a numeral, or a symbol.

15. The handheld electronic device according to claim 6, wherein the display unit comprises a touch display panel.

16. The handheld electronic device according to claim 6, wherein the handheld electronic device comprises a mobile phone or a personal digital assistant.

* * * * *